United States Patent
Yoshida et al.

(10) Patent No.: US 8,409,753 B2
(45) Date of Patent: Apr. 2, 2013

(54) ALKALINE STORAGE BATTERY

(75) Inventors: Shuhei Yoshida, Moriguchi (JP);
Yoshinobu Katayama, Moriguchi (JP);
Kazuaki Tamura, Moriguchi (JP);
Teruhito Nagae, Moriguchi (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 811 days.

(21) Appl. No.: 12/360,620

(22) Filed: Jan. 27, 2009

(65) Prior Publication Data

US 2009/0191449 A1   Jul. 30, 2009

(30) Foreign Application Priority Data

Jan. 29, 2008  (JP) ................................. 2008-017507

(51) Int. Cl.
*H01M 4/24* (2006.01)
*H01M 10/24* (2006.01)
(52) U.S. Cl. .................................... 429/218.2; 429/206
(58) Field of Classification Search .................. 429/206
See application file for complete search history.

(56) References Cited

U.S. PATENT DOCUMENTS

| 6,268,083 | B1 * | 7/2001 | Iida et al. ................. 429/218.2 |
| 7,033,704 | B2 * | 4/2006 | Sato et al. ..................... 429/247 |
| 2003/0194611 | A1 * | 10/2003 | Nakayama et al. .......... 429/218.2 |
| 2004/0134569 | A1 * | 7/2004 | Yasuoka et al. ............... 148/426 |
| 2008/0070117 | A1 * | 3/2008 | Bernard et al. ............. 429/218.2 |
| 2009/0169995 | A1 * | 7/2009 | Yoshida et al. ............. 429/218.2 |

FOREIGN PATENT DOCUMENTS

| EP | 1 253 654 A1 | 10/2002 |
| JP | 2000-082491 A | 3/2000 |
| JP | 2002-164045 A | 6/2002 |
| JP | 2007-294219 A | 11/2007 |

OTHER PUBLICATIONS

European Search Report dated Jul. 18, 2012, issued in corresponding European Patent Application No. 09001104.0 (7 pages).

* cited by examiner

*Primary Examiner* — Basia Ridley
*Assistant Examiner* — James Lee
(74) *Attorney, Agent, or Firm* — Westerman, Hattori, Daniels & Adrian, LLP

(57) ABSTRACT

An alkaline storage battery in which an actual reaction area is not reduced after increasing a reaction area is provided. A hydrogen storage alloy negative electrode 11 of an alkaline storage battery 10 of the present invention is formed in a strip form including a long axis and a short axis, in which the ratio (A/B) of a length A (cm) of the long axis to a length B (cm) of the short axis is 20 or more and 30 or less ($20 \leq A/B \leq 30$), and the ratio (X/Y) of an electrolyte volume X (g) retained in the hydrogen storage alloy negative electrode 11 to an electrolyte volume Y (g) retained in a separator 13 is 0.8 or more and 1.1 or less ($0.8 \leq X/Y \leq 1.1$). With this arrangement, an alkaline storage battery with high output characteristics and long-term durability performance is obtained.

1 Claim, 3 Drawing Sheets

ALKALINE STORAGE BATTERY

TECHNICAL FIELD

The present invention relates to an alkaline storage battery suited to applications requiring high-current discharge such as hybrid electric vehicles (HEVs) and pure electric vehicles (PEVs). More particularly, the invention relates to an alkaline storage battery including an electrode group fabricated by rolling a positive electrode using nickel hydroxide as a main positive electrode active material and a hydrogen storage alloy negative electrode using a hydrogen storage alloy as a negative electrode active material into a spiral form with a separator that keeps the two electrodes apart interposed therebetween, an alkaline electrolyte, and an outer can inside which the foregoing items are housed.

BACKGROUND ART

In recent years, alkaline storage batteries, especially nickel-hydrogen storage batteries, have been used for an electric current source for vehicles such as HEVs or PEVs. Long-term durability performance such as high output performance far beyond the conventional level and self-discharge characteristics is required in alkaline storage batteries for these types of use. Therefore, as a technique for higher output, increasing a reaction area between a positive electrode and a negative electrode as shown in JP-A-2000-082491 and JP-A-2007-294219 has been proposed.

In JP-A-2000-082491, in which increasing a reaction area is proposed, a positive electrode area is made to be 30 cm$^2$ or more per theoretical capacity (Ah) of a battery. This is based on the idea that the wider reaction area between a positive electrode and a negative electrode in a contained electrode group reduces the density of a current flowing between both electrodes, leading to no increase in the internal resistance of the electrode group when operating the battery at a high discharge rate; therefore, a high discharge current can be obtained without any decrease in an operating voltage. In this case, a value of the above-mentioned positive electrode area less than 30 cm$^2$/Ah does not reduce the internal resistance of the electrode group, leading to a decrease in an operating voltage and difficulty in attaining a high current discharge.

Meanwhile, the surface area of a negative electrode is made to be 120 cm$^2$ or more per nominal battery capacity (Ah) for increasing a reaction area that the inventors of the present invention proposed in JP-A-2007-294219.

However, even if a reaction area is increased as proposed in the above-mentioned JP-A-2000-082491 and JP-A-2007-294219, the following other two problems emerge.

A first problem is that there is a region in which no improvement of output characteristics is recognized even after increasing a reaction area. This means that increasing the number of electrode plate layers as an electrode group to increase the reaction area prevents an electrolyte from prevailing in the whole electrode plate, leading to a concentration of the electrolyte to both terminals in the direction of the short axis of a negative electrode plate as well as increase in a mass of the electrolyte stored in a separator. This reduces an actual reaction area of the electrode plate, leading to no improvement of output characteristics. In this case, increasing an electrolyte mass is shown to provide no resolution.

A second problem is that using an AB$_5$ type hydrogen storage alloy used in general as a negative electrode active material as a negative electrode plate with an increased reaction area is found to cause a degradation of self-discharge characteristics (an increase in self-discharge). This is partly because the distance between positive and negative electrode plates is shortened due to increasing the reaction area. Along with this, adding manganese and cobalt is essential to maintain the crystal structure of the AB$_5$ type hydrogen storage alloy.

Then, when the AB$_5$ type hydrogen storage alloy to which manganese and cobalt are added is oxidized, the added manganese and cobalt are eluted and deposited. This accelerates self-discharge, leading to degradation of self-discharge characteristics.

In this case, increasing an electrolyte mass retained in the negative electrode plate to solve the first problem causes further elution of manganese and cobalt, leading to marked degradation of self-discharge characteristics.

SUMMARY

An advantage of some aspects of the invention is to provide an alkaline storage battery which has excellent output characteristics and improved self-discharge characteristics by employing a battery structure in which an actual reaction area is not reduced when increasing a reaction area.

An alkaline storage battery according to an aspect of the present invention includes an electrode group fabricated by rolling a positive electrode using nickel hydroxide as a main positive electrode active material and a hydrogen storage alloy negative electrode using a hydrogen storage alloy as a negative electrode active material into a spiral form with a separator that keeps the two electrodes apart interposed therebetween, an alkaline electrolyte, and an outer can inside which the foregoing items are housed. The hydrogen storage alloy negative electrode is formed by a long axis and a short axis, in which a ratio (A/B) of a length A (cm) of the long axis to a length B (cm) of the short axis is 20 or more and 30 or less (20≦A/B≦30), and a ratio (X/Y) of an electrolyte mass X (g) retained in the hydrogen storage alloy negative electrode to an electrolyte mass Y (g) retained in the separator is 0.8 or more and 1.1 or less (0.8≦X/Y≦1.1).

When the ratio (A/B) of the length (A) of the long axis to the length (B) of the short axis of the hydrogen storage alloy negative electrode is less than 20 (A/B<20), it is found that a reaction area between a positive and negative electrodes cannot be increased, leading to no improvement in output characteristics. In addition, even when the ratio (A/B) of the length (A) of the long axis to the length (B) of the short axis of the hydrogen storage alloy negative electrode is 20 or more, it is found that output characteristics cannot be fully improved with a small electrolyte mass retained in the hydrogen storage alloy negative electrode.

Meanwhile, when the ratio (A/B) of the length (A) of the long axis to the length (B) of the short axis of the hydrogen storage alloy negative electrode is more than 30 (A/B>30), the thickness of each of electrodes and separators should be reduced, leading to difficulty in preparing from a point of view of a strength. In this case, adequate improvement of output characteristics is found to be practicable when A/B of the hydrogen storage alloy negative electrode is 20 or more and 30 or less (20≦A/B≦30) and when the ratio (X/Y) of the electrolyte mass X (g) retained in the hydrogen storage alloy negative electrode to the electrolyte mass Y (g) retained in a separator is 0.8 or more and 1.1 or less (0.8≦X/Y≦1.1).

Therefore, the ratio (X/Y) of the electrolyte mass X (g) retained in the hydrogen storage alloy negative electrode to the electrolyte mass Y (g) retained in the separator can preferably be 0.8 or more and 1.1 or less (0.8≦X/Y≦1.1). In this case, when the ratio Z (m$^2$/cm$^3$) of a surface area of a negative electrode (m$^2$) to an unit volume (1 cm$^3$) of a negative electrode active material is less than 31 m²/cm³, the above-mentioned ratio of an electrolyte mass (X/Y) does not become 0.8 or more, which indicates that output characteristics cannot be fully improved.

Meanwhile, warping of an electrode plate or falling off of active material is found to occur when the ratio Z (m²/cm³) of the surface area of the negative electrode (m²) to the unit volume (1 cm³) of the negative electrode active material is more than 117 m²/cm³.

Therefore, the ratio Z (m²/cm³) of the surface area of the negative electrode (m²) to the unit volume (1 cm³) of the negative electrode active material is preferably 31 m²/cm³ or more and 117 m²/cm³ or less (31 m²/cm³ ≦ Z ≦ 117 m²/cm³).

The hydrogen storage alloy used for the above-mentioned hydrogen storage alloy negative electrode preferably includes a component A composed of elements including at least a rare earth element and magnesium, and a component B composed of element(s) including at least nickel but excluding manganese and cobalt, and the hydrogen storage alloy preferably has a primary alloy phase of an $A_5B_{19}$ type structure.

Here, the hydrogen storage alloy containing a rare earth element, magnesium, and nickel as primary elements includes a combination of an $AB_2$ type structure with the $AB_5$ type structure, thereby forming an $A_2B_7$ type structure or the $A_5B_{19}$ type structure. In this case, the $A_5B_{19}$ type structure is a pile-up of a cyclic trilayer including the $AB_2$ type structure and the $AB_5$ type structure that enables the nickel (Ni) proportion per unit crystal lattice to be increased compared with the $A_2B_7$ type structure.

An increase in the nickel (Ni) proportion per unit crystal lattice enables an active point that accelerates adsorption and desorption of hydrogen to be increased, thereby improving high-output characteristics. In addition, hydrogen storage alloy containing rare earth element, magnesium, and nickel as primary elements includes a combination of the $AB_2$ type structure and the $AB_5$ type structure that are mediated by magnesium, thereby removing manganese and cobalt.

Therefore, by using an alkaline storage battery which is made to have a reaction area between positive and negative electrodes far beyond conventional level using such hydrogen storage alloy, both high output characteristics and long-term durability performance can be achieved.

According to the invention, a reaction area between a positive and negative electrode is increased by optimizing the ratio of a long axis length to a short axis length, and an electrode group constitution that increases an electrolyte mass retained to a hydrogen storage alloy negative electrode is employed. With this arrangement, an alkaline storage battery with high output characteristics and long-term durability performance is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
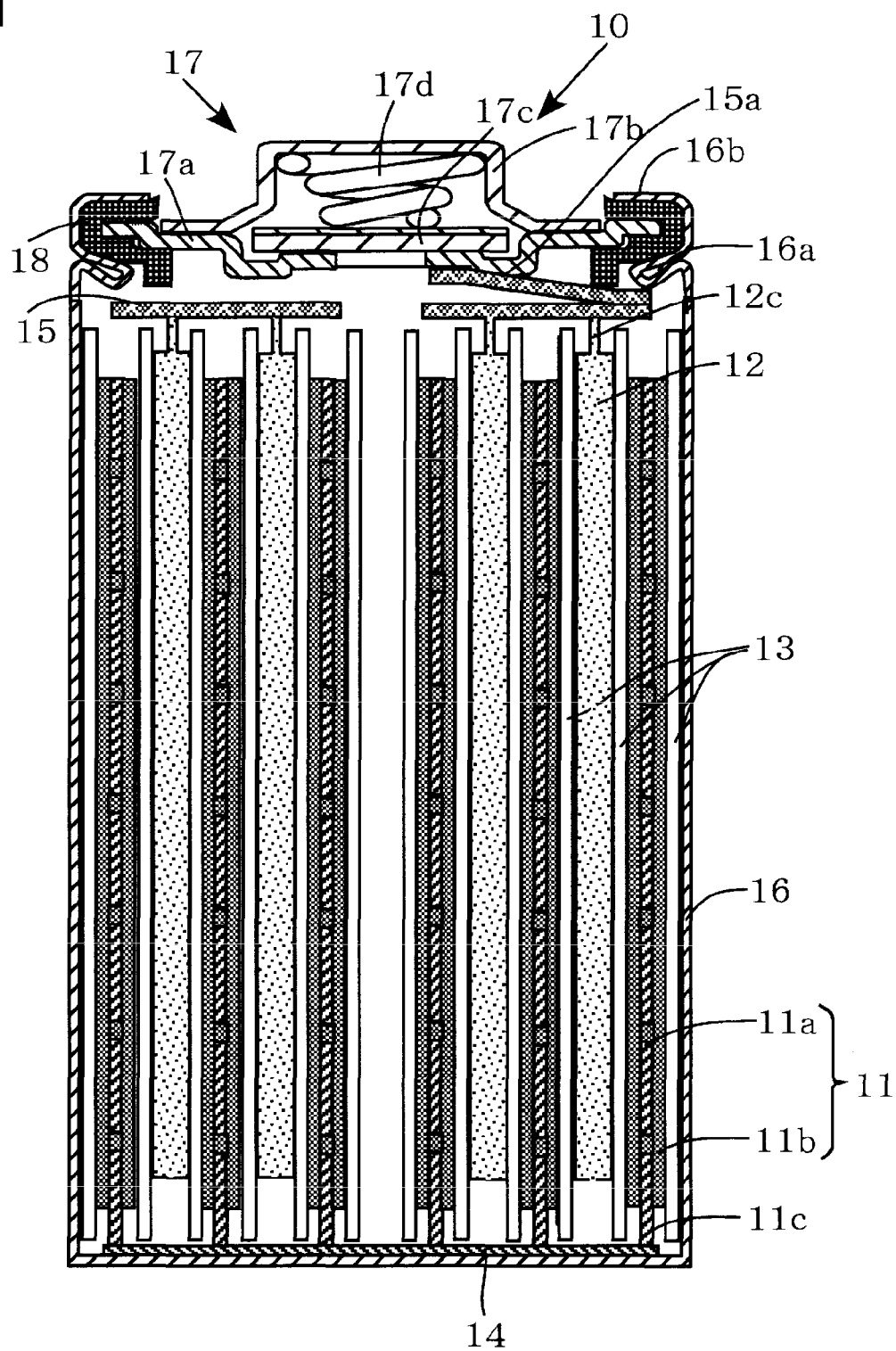
FIG. 1 is a sectional view schematically showing an alkaline storage battery according to an embodiment of the present invention.
Figure 2:
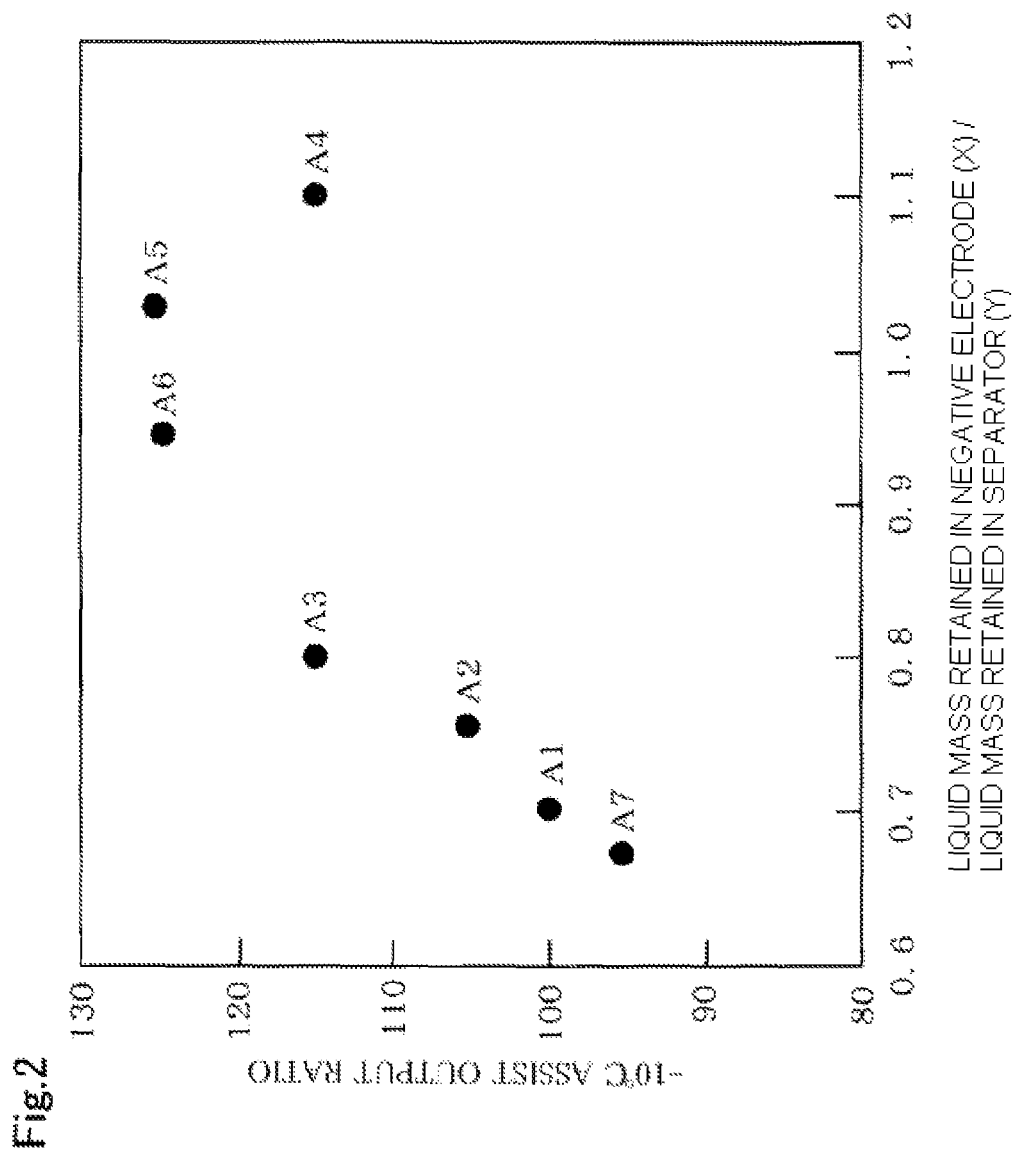
FIG. 2 is a graph showing a relationship between a ratio (X/Y) of an electrolyte mass (X) retained in a negative electrode to an electrolyte mass (Y) retained in a separator and a −10° C. assist output ratio.
Figure 3:
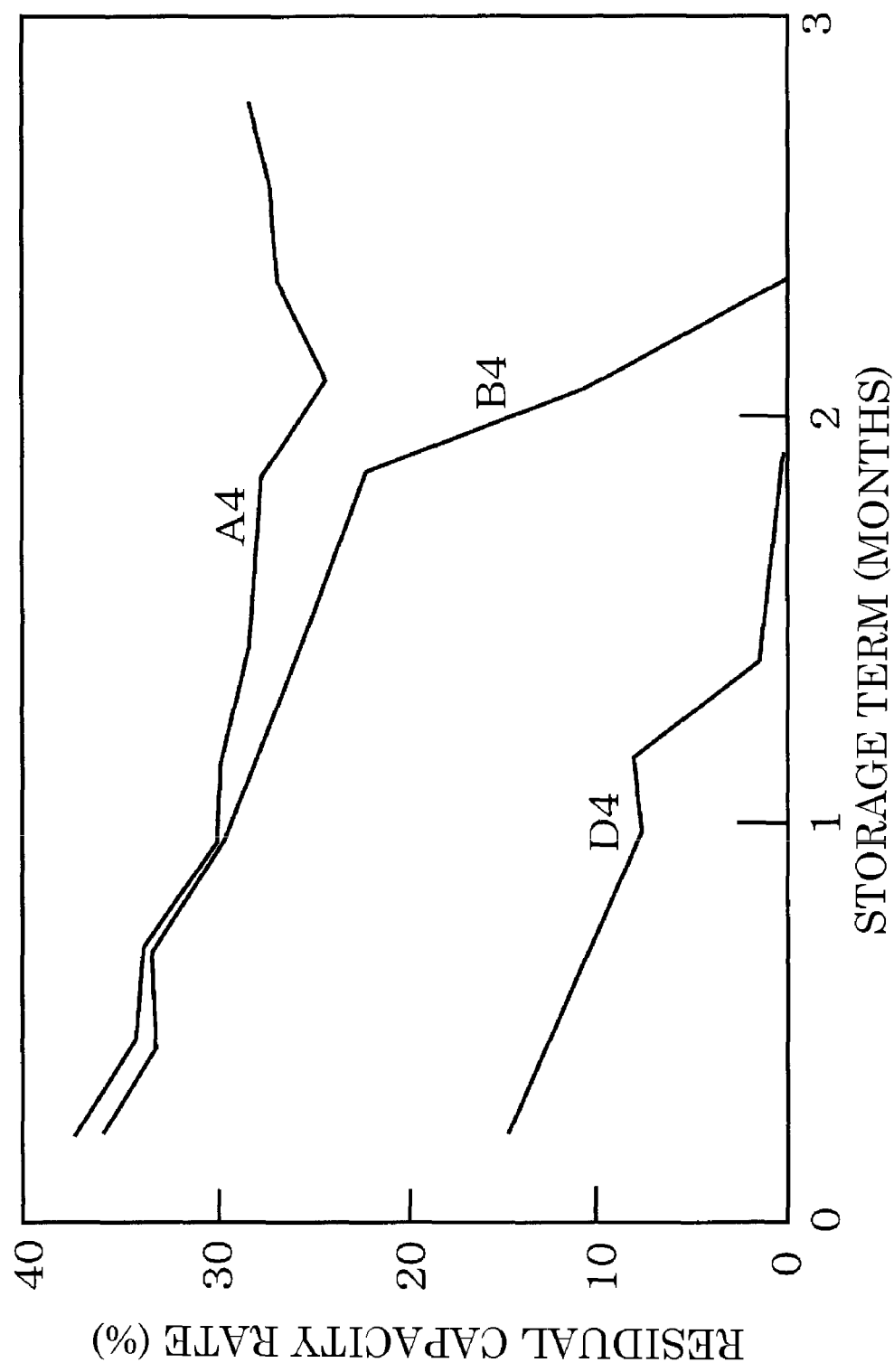
FIG. 3 is a graph showing a relationship between a storage term and a residual capacity rate.

Next, the embodiments of the invention are described in detail as follows. However, the invention is not limited to these specific embodiments and, within the spirit and scope of the invention, various modifications and alterations may be made. FIG. 1 is a cross sectional view schematically showing an alkaline storage battery of the invention. FIG. 2 is a graph showing a relationship between a ratio (X/Y) of an electrolyte mass (X) retained to a negative electrode to an electrolyte mass (Y) retained to a separator and a −10° C. assist output ratio. FIG. 3 is a graph showing the relationship between a storage term and a residual capacity rate.

1. Hydrogen Storage Alloy

After mixing metal elements such as lanthanum (La), cerium (Ce), praseodymium (Pr), neodymium (Nd), magnesium (Mg), nickel (Ni), aluminum (Al), cobalt (Co), and manganese (Mn) to be a predetermined molar ratio specified in Table 1 below, these mixtures are put into a high-frequency induction furnace under an argon gas atmosphere to melt and then is cooled to form ingots which are hydrogen storage alloys a, b, c, and d.

In this case, the hydrogen storage alloy a is represented by a compositional formula of $La_{0.3}Nd_{0.5}Mg_{0.2}Ni_{3.4}Al_{0.3}$ and the hydrogen storage alloy b is represented as $La_{0.3}Nd_{0.5}Mg_{0.2}Ni_{3.4}Al_{0.2}Co_{0.1}$. In addition, the hydrogen storage alloy c is represented as $La_{0.2}Pr_{0.3}Nd_{0.3}Mg_{0.2}Ni_{3.1}Al_{0.2}$ and the hydrogen storage alloy d is represented as $La_{0.8}Ce_{0.1}Pr_{0.05}Nd_{0.05}Ni_{4.2}Al_{0.3}(Co, Mn)_{0.7}$.

Next, a melting point (Tm) of each of obtained hydrogen storage alloys a to d was measured by using a differential scanning calorimeter (DSC). Then, thermal treatment was conducted at a temperature lower than a melting point (Tm) by 30° C. (Ta=Tm−30° C.) of these hydrogen storage alloys a to d for a predetermined period of time (in this case, 10 hours). Then, a mass of each of these hydrogen storage alloys a to d were ground roughly and then ground mechanically under an inert gas atmosphere to prepare hydrogen storage alloy powders a to d having a particle diameter of volume cumulative frequency 50% (D50) of 25 μm.

Next, crystal structures of the hydrogen storage alloy powders a to d were identified by an X-ray powder diffraction method using an X-ray diffractometer with a Cu—Kα tube as an X-ray source. In this case, an X-ray diffraction measurement was conducted under the conditions of a scanning speed of 1°/min, a tube voltage of 40 kV, a tube current of 300 mA, a scanning step of 1°, and a measurement angle (2θ) of 20-50°. Based on an obtained XRD profile, the crystal structure of each of the hydrogen storage alloys a to d was identified using a JCPDS card chart.

Here, according to the compositional ratio of each crystal structure, a $Ce_5Co_{19}$ type structure and a $Pr_5Co_{19}$ type structure are categorized into the $A_5B_{19}$ type structure; a $Ce_2Ni_7$ type structure is categorized into the $A_2B_7$ type structure; and an $LaNi_5$ type structure is categorized into the $AB_5$ type structure, and compositional ratio of each structure was calculated by applying a comparative strength ratio of a strength value of a diffraction angle of each structure with a maximum strength value of 42-44°, based on the JCPDS, to the obtained XRD profile to obtain the results as shown in Table 1 below.

TABLE 1

| Type of alloy | Composition of Hydrogen Storage Alloy $Ln_{1-x}Mg_xNi_{y-a-b}Al_aM_b$ | Compositional Ratio of Crystal Structure (%) | | |
|---|---|---|---|---|
| | | $A_5B_{19}$ | $A_2B_7$ | $AB_5$ |
| a | $La_{0.3}Nd_{0.5}Mg_{0.2}Ni_{3.4}Al_{0.3}$ | 59 | 40 | 1 |
| b | $La_{0.3}Nd_{0.5}Mg_{0.2}Ni_{3.4}Al_{0.2}Co_{0.1}$ | 55 | 42 | 3 |
| c | $La_{0.2}Pr_{0.3}Nd_{0.3}Mg_{0.2}Ni_{3.1}Al_{0.2}$ | 0 | 99 | 1 |
| d | $La_{0.8}Ce_{0.1}Pr_{0.05}Nd_{0.05}Ni_{4.2}Al_{0.3}(Co, Mn)_{0.7}$ | 0 | 0 | 100 |

The results as shown in Table 1 demonstrate the following. That is, the hydrogen storage alloys a and b include mainly the $A_5B_{19}$ type structures and the $A_2B_7$ type structures, the hydrogen storage alloy c includes mainly the $A_2B_7$ type structures, and the hydrogen storage alloy d includes the $AB_5$ type structures.

2. Hydrogen Storage Alloy Negative Electrode

Using the above-mentioned hydrogen storage alloy powder a, a hydrogen storage alloy electrode 11 (a1 to a7) was prepared as follows. First, SBR (styrene butadiene rubber) as a thermoplastic elastomer and ketjen black as a carbon conductor were added to a water soluble binder which includes 0.1% by mass of CMC (carboxymethylcellulose) and water (or pure water) per 100 parts by mass of an obtained hydrogen storage alloy powder a, so that a surface area of a negative electrode ($m^2$) represents a predetermined value ($m^2/cm^3$) per unit volume ($cm^3$) of an active material as shown in Table 2 below.

After that, these were blended and well mixed to prepare each hydrogen storage alloy slurry. Next, a negative electrode substrate 11a made of a Ni-plated soft steel porous plaque (punched metal) is prepared, and hydrogen storage alloy slurry was applied, so that a packing density becomes 5.0 g/$cm^3$, to this negative electrode substrate 11a that is rolled to a predetermined thickness after drying to form an active material 11b. Then, it is cut into predetermined sizes (so that the ratio of a length of long axis to a length of a short axis is those shown in the Table 2 below) to prepare the hydrogen storage alloy negative electrode 11 (a1 to a7).

Next, the surface areas Z ($m^2/cm^3$) of a negative electrode per unit volume of an active material of these hydrogen storage alloy negative electrodes a1 to a7 were determined to obtain the results as shown in Table 2 below. In this case, the surface area Z ($m^2/cm^3$) of a negative electrode per unit volume of an active material as calculated based on the following equation (1) using specific surface areas S1, S2, and S3 ($m^2/g$) determined by BET method in each component (hydrogen storage alloy, carbon conductor, thermoplastic elastomer) of an active material, additive amounts G1, G2, and G3 (g) of each component, volume V ($cm^3$) of active material after rolling:

$$Z(m^2/cm^3) = (S1 \times G1 + S2 \times G2 + S3 \times G3)/V \quad (1)$$

Here, the hydrogen storage alloy negative electrode a1 has the ratio (A/B) of a long axis length (A) to a short axis length (B) of 15 and the surface area of a negative electrode per unit volume of an active material of 31 ($m^2/cm^3$). In the same manner, the hydrogen storage alloy negative electrode a2 has the ratio (A/B) of 20 and the surface area of a negative electrode per unit volume of 17 ($m^2/cm^3$); the hydrogen storage alloy negative electrode a3 has the ratio (A/B) of 20 and the surface area of a negative electrode per unit volume of 31 ($m^2/cm^3$); and the hydrogen storage alloy negative electrode a4 has the ratio (A/B) of 20 and the surface area of a negative electrode per unit volume of 64 ($m^2/cm^3$). Also, the hydrogen storage alloy negative electrode a5 has the ratio (A/B) of 30 and the surface area of a negative electrode per unit volume of 31 ($m^2/cm^3$); the hydrogen storage alloy negative electrode a6 has the ratio (A/B) of 20 and the surface area of a negative electrode per unit volume of 117 ($m^2/cm^3$); and the hydrogen storage alloy negative electrode a7 has the ratio (A/B) of 20 and the surface area of a negative electrode per unit volume of 128 ($m^2/cm^3$). In addition, warpage and peeling of active material occurred after rolling of the hydrogen storage alloy negative electrode a7.

TABLE 2

| Types of negative electrodes | Long axis length/short axis length (B/A) | Surface area per unit volume ($m^2/cm^3$) |
|---|---|---|
| a1 | 15 | 31 |
| a2 | 20 | 17 |
| a3 | 20 | 31 |
| a4 | 20 | 64 |
| a5 | 30 | 31 |
| a6 | 20 | 117 |
| a7 | 20 | 128 |

3. Nickel Positive Electrode

On the other hand, a porous sintered nickel plaque with a porosity of approx. 85% was immersed into a mixed aqueous solution of nickel nitrate and cobalt nitrate having a specific gravity of 1.75 to retain nickel salt and cobalt salt in a pore of the porous sintered nickel plaque. Then, this porous sintered nickel plaque was immersed in 25% by mass of sodium hydroxide (NaOH) aqueous solution to convert nickel salt and cobalt salt into nickel hydroxide and cobalt hydroxide, respectively.

Next, after fully washing with water to remove alkaline solution out, active material containing nickel hydroxide as a principal component is filled in a pore of the porous sintered nickel plaque after drying. Such active material filling procedure was repeated a predetermined number of times (for example, 6 times) to fill nickel hydroxide in a pore of a porous sintered plaque so that a packing density of active material as main part becomes 2.5 g/$cm^3$. Then, it is cut into a predetermined size after being dried at room temperature to prepare a nickel positive electrode 12.

4. Nickel-Hydrogen Storage Battery

After that, the hydrogen storage alloy negative electrode 11 (a1 to a6) and the nickel positive electrode 12 prepared as described above were rolled into a spiral form with a separator 13 made of sulfonated nonwoven fabric interposed therebetween to fabricate a spiral electrode group. A substrate exposed part 11c of hydrogen storage alloy negative electrode 11 was exposed on the bottom part of thus prepared spiral electrode group, and a substrate exposed part 12c of nickel positive electrode 12 was exposed on the upper part of thus prepared spiral electrode group. Next, a negative electrode current collecting body 14 was welded to the substrate exposed part 11c that is exposed on the bottom end surface of the obtained spiral electrode group along with welding a positive electrode 15 on the substrate exposed part 12c of the nickel electrode 12 that is exposed on the top end surface of the spiral electrode group to make an electrode body.

Next, after the obtained electrode body is housed in a bottomed cylindrical outer can (outer surface of the bottom surface is the outer terminal of a negative electrode) 16 that was made of nickel-plated iron, the negative electrode current collecting body 14 was welded to the inner bottom surface of the outer can 16. A current collecting lead part 15a extending outward from the positive electrode current collecting body 15, serving also as a positive electrode terminal, was welded to a sealing plate 17a constituting the bottom part of the sealing body 17, whose periphery is equipped with an insulating gasket 18. The sealing body 17 is equipped with a positive electrode cap 17b, and a pressure valve including a valve body 17c that is deformed under a predetermined pressure and a spring 17d are placed within this positive electrode cap 17b.

Next, after an annular groove part 16a is formed on the upper periphery of the outer can 16, an electrolyte was injected, and the insulating gasket 18 that is equipped on the periphery of the sealing body 17 was mounted on the annular groove part 16a formed on the upper surface of the outer can 16. After that, a nickel-hydrogen storage battery 10 (A1 to A7) was prepared by crimping an opening end edge 16b of the outer can 16. In this case, an alkaline electrolyte including 30% by mass of potassium hydroxide (KOH) aqueous solution was injected in the outer can 16 so as to be 2.5 g (2.5 g/Ah) or 2.8 g (2.8 g/Ah) per battery capacity (Ah) to prepare the nickel-hydrogen storage battery 10 (A1 to A7).

Now, the battery A1 is a battery in which 2.5 g/Ah of an electrolyte was injected and the hydrogen storage alloy negative electrode a1 was used. In the same manner, the battery A2 is a battery in which the hydrogen storage alloy negative electrode a2 was used, the battery A3 is a battery in which the hydrogen storage alloy negative electrode a3 was used, the battery A4 is a battery in which the hydrogen storage alloy negative electrode a4 was used, the battery A5 is a battery in which the hydrogen storage alloy negative electrode a5 was used, and the battery A6 is a battery in which the hydrogen storage alloy negative electrode a6 was used. Also, the battery A7 is a battery in which 2.8 g/Ah of an electrolyte was injected and the hydrogen storage alloy negative electrode a1 was used.

5. Battery Tests (1) Activation

Next, the batteries A1 to A7 that were prepared as mentioned above were activated as follows. In this case, after the prepared batteries were left until the battery voltage become 60% of the peak voltage during the storage, the batteries were charged to 120% of a state of charge (SOC) at a temperature atmosphere of 25° C. and a charging current of 1 It, followed by a 1 hour pause at a temperature atmosphere of 25° C. Next, after storage as it was at a temperature atmosphere of 70° C. for 24 hours, a cycle of a discharge was conducted at a temperature atmosphere of 45° C. until a battery voltage becomes 0.3 V with a discharging current of 1 It. This cycle was repeated twice to activate the batteries A1 to A7.

(2) Determination of Ratio of Electrolyte Mass

After activation as described above, each of these batteries A1 to A7 was disassembled into their respective components, such as the hydrogen storage alloy negative electrode 11, the nickel positive electrode 12, the separator 13, the current collecting bodies 14 and 15, and the outer can 16. Next, difference in mass between immediately after disassembling and after vacuum drying, namely an electrolyte mass retained in each component, was measured. Here, the ratio of an electrolyte mass retained in a hydrogen storage alloy negative electrode to the electrolyte mass retained in a separator, namely the ratio (X/Y) of a liquid mass in the negative electrode (X) to a liquid mass in the separator (Y) was calculated as showing the result in Table 3 below.

(3) Assessment of Output Characteristics

After the activation as described above, at a temperature atmosphere of 25° C., charging was conducted at a charging current of 1 It to 50% of the SOC followed by a 1 hour pause at a temperature atmosphere of 25° C. Next, after charging was conducted for 20 seconds at a temperature atmosphere of −10° C. and at an arbitrary charge rate followed by a 30 minute pause at a temperature atmosphere of −10° C. After that, discharging was conducted at a temperature atmosphere of −10° C. and at an arbitrary discharge rate for 10 seconds followed by a 30 minute pause at a temperature atmosphere of 25° C. Such a cycle including charging at a temperature atmosphere of −10° C. and at an arbitrary charge rate for 20 seconds, 30 minute pause, discharging at an arbitrary discharge rate for 10 seconds, and 30 minute pause at a temperature atmosphere of 25° C., was repeated.

In this case, while, at an arbitrary charge rate, a charging current was increased in the order of 0.8 It→1.7 It→2.5 It→3.3 It→4.2 It, at an arbitrary discharge rate, a discharging current was increased in the order of 1.7 It→3.3 It→5.0 It→6.7 It→8.3 It, each battery voltage (V) of each of batteries A1 to A7 was measured at each discharge rate at the time of lapse of 10 seconds from the start of each discharge rate. Here, as an index of discharge characteristics (assist output characteristics), 0.9 V current on the discharge V-I plot fitted curve was determined in the form of a −10° C. assist output. The obtained −10° C. assist output was used for determining a relative ratio to a −10° C. assist output of battery A1 used as a reference (100) of a −10° C. assist output ratio (relative to battery A1), providing the results shown in Table 3 below.

In addition, based on the results shown in Table 3, the ratio (X/Y) of a mass of liquid retained in the hydrogen storage alloy negative electrode (negative electrode liquid mass: X) to a mass of liquid retained in the separator (separator liquid mass, Y) was plotted on the horizontal axis (X axis) and a −10° C. assist output ratio was plotted on the vertical axis (Y axis), providing a graph as the result as shown in FIG. 2.

TABLE 3

| Types of batteries | Types of electrodes | Hydrogen storage alloy negative electrode | | Electrolyte | | −10° C. assist output ratio |
|---|---|---|---|---|---|---|
| | | Long axis length/short axis length (A/B) | Surface area per unit volume | Electrolyte mass per capacity | Negative electrode liquid mass/separator liquid mass (X/Y) | |
| A1 | a1 | 15 | 31 (m²/cm³) | 2.5 (g/Ah) | 0.71 | 100 |
| A2 | a2 | 20 | 17 (m²/cm³) | 2.5 (g/Ah) | 0.76 | 106 |
| A3 | a3 | 20 | 31 (m²/cm³) | 2.5 (g/Ah) | 0.80 | 115 |
| A4 | a4 | 20 | 64 (m²/cm³) | 2.5 (g/Ah) | 1.10 | 115 |
| A5 | a5 | 30 | 31 (m²/cm³) | 2.5 (g/Ah) | 1.03 | 124 |
| A6 | a6 | 20 | 117 (m²/cm³) | 2.5 (g/Ah) | 0.94 | 123 |
| A7 | a1 | 15 | 31 (m²/cm³) | 2.8 (g/Ah) | 0.67 | 96 |

The results as shown in Table 3 and FIG. 2 revealed the following. That is, comparison between the battery A1 and the battery A7 with using the identical negative electrode a1 shows that the increased electrolyte mass does not increase the ratio (X/Y) of a negative electrode liquid mass to a separator liquid mass. When the ratio (A/B) of the long axis length (A) to the short axis length (B) of the negative electrode is 20 or more and 30 or less and when a surface area of an active material per unit volume is 31 (m²/cm³) or more and 117 (m²/cm³) or less, the ratio (X/Y) of a negative electrode liquid mass to a separator liquid mass is increased to 0.80 to 1.10. When the ratio (X/Y) of a negative electrode liquid volume to a separator liquid mass is increased to 0.80 to 1.10, the −10° C. assist output ratio (relative to battery A1) is increased to 115 to 124.

Therefore, the ratio (X/Y) of an electrolyte mass X (g) retained in the hydrogen storage alloy negative electrode to an electrolyte mass Y (g) retained in the separator is found to be preferably 0.8 or more and 1.10 or less ($0.8 \leq X/Y \leq 1.10$), and the surface area Z (m²/cm³) of a negative electrode per 1 cm³ of a negative electrode active material is preferably 31 m²/cm³ or more and 117 m²/cm³ or less (31 m²/cm³ $\leq Z \leq$ 117 m²/cm³).

6. Investigation of Composition of Hydrogen Storage Alloy

Next, using the above-mentioned hydrogen storage alloy b ($La_{0.3}Nd_{0.5}Mg_{0.2}Ni_{3.4}Al_{0.2}Co_{0.1}$), the hydrogen storage alloy c ($La_{0.2}Pr_{0.3}Nd_{0.3}Mg_{0.2}Ni_{3.1}Al_{0.2}$), and the hydrogen storage alloy d ($La_{0.8}Ce_{0.1}Pr_{0.05}Nd_{0.05}Ni_{4.2}Al_{0.3}(Co,Mn)_{0.7}$), hydrogen storage alloy negative electrodes b4, c4, and d4 were prepared in the same manner as above. In this case, preparation was done so that the ratio (A/B) of the long axis length (A) to the short axis length (B) of the negative electrode is 20 and that surface area per unit volume is 31 (m²/cm³). Next, using these negative electrodes b4, c4, and d4, each of nickel-hydrogen storage batteries B4, C4, and D4 was prepared in the same manner above by injecting an electrolyte so that an electrolyte mass per capacity is 2.5 (g/Ah). In this case, the battery B4 is a battery in which the negative electrode b4 was used, the battery C4 is a battery in which the negative electrode c4 was used, and the battery D4 is a battery in which the negative electrode d4 was used.

Next, each of these batteries B4, C4, and D4 was activated in the same manner as above and then disassembled into each component to determine the difference in mass between immediate after disassembling and after vacuum drying in the same manner as above. The ratio (X/Y) of a negative electrode liquid mass (X) to a separator liquid mass (Y) was calculated to obtain results as shown in Table 4 below. In addition, after activation, a −10° C. assist output was determined in the same manner as above, and the obtained −10° C. assist output was used for determining a relative ratio to a −10° C. assist output of battery A1 used as a reference (100) of a −10° C. assist output ratio (relative to battery A1), providing the results shown in Table 4. Table 4 also shows the results of the above-mentioned battery A4.

TABLE 4

| Types of batteries | Types of electrodes | Composition of Hydrogen Storage Alloy $Ln_{1-x}Mg_xNi_{y-a-b}Al_aM_b$ | $A_5B_{19}$ | $A_2B_7$ | $AB_5$ | Negative electrode liquid mass/separator liquid mass (X/Y) | −10° C. assist output ratio |
|---|---|---|---|---|---|---|---|
| A4 | a | $La_{0.3}Nd_{0.5}Mg_{0.2}Ni_{3.4}Al_{0.3}$ | 59% | 40% | 1% | 0.80 | 115 |
| B4 | b | $La_{0.3}Nd_{0.5}Mg_{0.2}Ni_{3.4}Al_{0.2}Co_{0.1}$ | 58% | 39% | 3% | 0.80 | 110 |
| C4 | c | $La_{0.2}Pr_{0.3}Nd_{0.3}Mg_{0.2}Ni_{3.1}Al_{0.2}$ | 0% | 99% | 1% | 0.75 | 100 |
| D4 | d | $La_{0.8}Ce_{0.1}Pr_{0.05}Nd_{0.05}Ni_{4.2}Al_{0.3}(Co,Mn)_{0.7}$ | 0% | 0% | 100% | 0.79 | 107 |

The results as shown in Table 4 demonstrate the following: that is, the battery C4 in which the hydrogen storage alloy c has a composition excluding the $A_5B_{19}$ type structure has a small −10° C. assist output ratio. This may be because the hydrogen storage alloy c having a composition excluding the $A_5B_{19}$ type structure has reduced activity.

[Charge-Discharge Cycle Test]

Using these batteries A4, B4, and D4, a charge-discharge cycle test was conducted as follows. In this case, at a temperature atmosphere of 25° C., charging was conducted at a charging current of 1 It to 80% of the SOC followed by a 1 hour pause at a temperature atmosphere of 25° C. Next, discharging was conducted until a battery voltage reached 0.9 V at a temperature atmosphere of 25° C. and at a discharging current of 1 It to determine the discharge capacity (first discharge capacity) according to the discharging time.

Next, after a 1 hour pause at a temperature atmosphere of 25° C., charging was conducted at a temperature atmosphere of 25° C. and at a charging current of 1 It to 80% of the SOC followed by a 7-day pause at a temperature atmosphere of 80° C. Next, discharging was conducted until a battery voltage reached 0.9 V at a temperature atmosphere of 25° C. and at a discharging current of 1 It to determine the discharge capacity (second discharge capacity) according to the discharging time. After that, refreshing was conducted 3-time. These are repeated as 1 cycle of the charge-discharge cycle test. Then, at every cycle, the capacity ratio (%) of the second discharge capacity to the first discharge capacity was calculated as a residual capacity rate. Then, the total storage term (i.e. an integrated value of storage term) was plotted on the horizontal axis (X axis), and a residual capacity rate (%) was plotted on the vertical axis (Y axis), providing the results shown in FIG. 3.

The results as shown in FIG. 3 demonstrate the following: that is, the battery D4, in which the hydrogen storage alloy d with a composition of the $AB_5$ type structure excluding the $A_5B_{19}$ type structure was used, has a reduced residual capacity rate (%) indicating less durability. On the other hand, the batteries A4 and B4, in which the hydrogen storage alloys a and b with a composition of mainly the $A_5B_{19}$ type structure and the $A_2B_7$ type structure, have an increased residual capacity rate (%) indicating improved durability.

This is because the $A_5B_{19}$ type structure is a pile-up of a cyclic trilayer including the $AB_2$ type structure and the $AB_5$ type structure that enables the nickel (N) proportion per unit crystal lattice to be increased compared with the $A_2B_7$ type structure. An increase in the nickel (Ni) proportion per unit crystal lattice enables an active point that accelerates adsorption of a hydrogen molecule and dissociation into a hydrogen atom to be increased, thereby improving high-output characteristics. Also, a hydrogen storage alloy containing a rare earth element, magnesium, and nickel as primary elements includes the $AB_2$ type structure and the $AB_5$ type structure that are mediated by magnesium, thereby removing manganese and cobalt.

Therefore, by using an alkaline storage battery which is made to have a reaction area between positive and negative electrodes far beyond conventional level using such hydrogen storage alloy, both high output characteristics and long-term durability performance can be achieved.

In the above described embodiment, an example of the SBR which is a styrene thermoplastic elastomer, as a thermoplastic elastomer was described, but olefin, PVC, urethane, ester, or amide thermoplastic elastomer can be used as a thermoplastic elastomer other than styrene thermoplastic elastomer. Also, in the above described embodiment, an example of addition of ketjen black as a carbon conductor was described, but an activated carbon or carbon nanomaterials such as a carbon nanotube can be added as a carbon conductor other than ketjen black.

What is claimed is:

1. An alkaline storage battery comprising:

an electrode group fabricated by rolling a positive electrode using nickel hydroxide as a main positive electrode active material and a hydrogen storage alloy negative electrode using a hydrogen storage alloy as a negative electrode active material into a spiral form with a separator keeping the two electrodes apart interposed therebetween;

an alkaline electrolyte; and an outer can containing the electrode group and the alkaline electrolyte inside thereof;

the hydrogen storage alloy negative electrode being formed in a strip form including a long axis and a short axis, in which a ratio (A/B) of a length A (cm) of the long axis to a length B (cm) of the short axis is 20 or more and 30 or less ($20 \leq A/B \leq 30$), a ratio (X/Y) of an electrolyte mass X (g) retained in the hydrogen storage alloy negative electrode to an electrolyte mass Y (g) retained in the separator being 0.8 or more and 1.1 or less ($0.8 \leq X/Y \leq 1.1$);

the hydrogen storage alloy negative electrode including a hydrogen storage alloy used as a negative electrode active material, an adhesive paste made of a thermoplastic elastomer, and a carbon conductor;

a ratio Z ($m^2/cm^3$) of a surface area of the negative electrode ($m^2$) to a unit volume (1 $cm^3$) of a negative electrode active material is 31 $m^2/cm^3$ or more and 117 $m^2/cm^3$ or less ($31\ m^2/cm^3 \leq Z \leq 117\ m^2/cm^3$);

the hydrogen storage alloy includes a component A composed of elements including at least a rare earth element and magnesium, and a component B composed of element(s) including at least nickel but excluding manganese and cobalt; and the hydrogen storage alloy has $A_5B_{19}$, $A_2B_7$ and $AB_5$ type structures, and has a primary alloy phase of an $A_5B_{19}$ type structure;

wherein surface area Z ($m^2/cm^3$) of a negative electrode per unit volume of an active material as calculated based on the following equation (1) using specific surface areas S1, S2, and S3 ($m^2/g$) determined by BET method in each component (hydrogen storage alloy, carbon conductor, thermoplastic elastomer) of an active material, additive amounts G1, G2, and G3 (g) of each component, volume V ($cm^3$) of active material after rolling:

$$Z(m^2/cm^3) = (S1 \times G1 + S2 \times G2 + S3 \times G3)/V \qquad (1).$$

* * * * *